(12) United States Patent
Wang et al.

(10) Patent No.: US 7,941,791 B2
(45) Date of Patent: May 10, 2011

(54) PROGRAMMING ENVIRONMENT FOR HETEROGENEOUS PROCESSOR RESOURCE INTEGRATION

(76) Inventors: Perry Wang, San Jose, CA (US);
Jamison Collins, San Jose, CA (US);
Gautham Chinya, Hillsboro, OR (US);
Hong Jiang, El Dorado Hills, CA (US);
Hong Wang, Fremont, CA (US);
Xinmin Tian, Union City, CA (US);
Guei-Yuan Lueh, San Jose, CA (US)

( * ) Notice: Subject to any disclaimer, the term of this patent is extended or adjusted under 35 U.S.C. 154(b) by 1061 days.

(21) Appl. No.: 11/786,920

(22) Filed: Apr. 13, 2007

(65) Prior Publication Data
US 2008/0256330 A1    Oct. 16, 2008

(51) Int. Cl.
*G06F 9/45* (2006.01)
(52) U.S. Cl. ........................................ 717/140
(58) Field of Classification Search .................. 717/140
See application file for complete search history.

(56) References Cited

U.S. PATENT DOCUMENTS

| 5,968,162 | A  | * | 10/1999 | Yard ........................... | 712/203 |
| 7,243,333 | B2 | * | 7/2007  | Gschwind et al. ............ | 717/107 |
| 7,493,472 | B2 | * | 2/2009  | Baxter ......................... | 712/43  |
| 2004/0199919 | A1 | * | 10/2004 | Tovinkere .................... | 718/102 |

OTHER PUBLICATIONS

Feng Liu and Vipin Chaudhary, "Extending OpenMP for Heterogeneous Chip Multiprocessors", Proceedings of the 2003 International Conference on Parallel Processing (ICPP'03).*

* cited by examiner

*Primary Examiner* — Philip Wang
(74) *Attorney, Agent, or Firm* — Shireen Irani Bacon

(57) ABSTRACT

Compiling a source code program for a heterogeneous multi-core processor having a first instruction sequencer, having a first instruction set architecture, an accelerator to the first instruction sequencer, wherein the accelerator comprises a heterogeneous resource with respect to the first instruction sequencer having a second instruction set architecture, the source code program having specified therein a region of source code for the first instruction set architecture of the processor and a region of source code for the second instruction set architecture of the processor.

12 Claims, 3 Drawing Sheets

PROGRAMMING ENVIRONMENT FOR HETEROGENEOUS PROCESSOR RESOURCE INTEGRATION

CROSS-REFERENCE TO RELATED APPLICATION

The present application is related to pending U.S. patent application Ser. No. 11/477,643 entitled "HANDLING ADDRESS TRANSLATIONS AND EXCEPTIONS OF A HETEROGENEOUS RESOURCE," and assigned to the assignee of the present invention.

The present application is related to pending U.S. patent application Ser. No. 11/321,779 entitled "INSTRUCTION SET ARCHITECTURE-BASED INTER-SEQUENCER COMMUNICATIONS WITH A HETEROGENEOUS RESOURCE," and assigned to the assignee of the present invention.

BACKGROUND

Embodiments of the present invention relate to a processor-based system, and more particularly to a system including multiple sequencers of different instruction set architectures.

Computer systems include various components to process and communicate data. Typical systems include one or multiple processors, each of which may include multiple cores, along with associated memories, input/output (I/O) devices and other such components. To improve computation efficiencies, computation accelerators, special-purpose I/O devices and other such specialized units may be provided via one or more specialized components, referred to generically herein as helper units. However, inefficiencies may occur in using such helper units, as in a typical computing environment that implements a general-purpose processor and an industry-standard operating system (OS) environment, a software stack can impede efficient usage. That is, in a typical OS environment, system software is isolated from application software via different privilege levels, and operations in each of these different privilege levels are subject to OS context save and restore operations, among other limitations. Further, helper units typically lack the ability to handle processing of exceptions and faults that allow robust handling of certain events during execution.

Classic examples of a computation accelerator are coprocessors such as math coprocessors like so-called x87 floating point coprocessors for early x86 processors. Typically, such coprocessors are coupled to a main processor (e.g., a central processing unit (CPU)) via a coprocessor interface, which is of a common instruction set architecture (ISA) as the main processor. More recently, separate resources having different instruction set architectures (ISAs) have appeared in systems.

Compilers generally are translation tools that convert a high level program in a high level source language, such as C or C++ among many others, into object code executable on a processor. Compilers may include functionality that allows the definition of inline, hand written assembly code within a main program that is executable on the ISA of a main processor, or on a coprocessor. Such assembly code may be translated by an assembler dynamically linked to a compiler for the high level language for the language in which the main program is written.

In some compilation systems, directives are available for a programmer to specify parallel execution of threads. For example, an OpenMP parallel pragma may be used to demarcate a program region for fork-join parallel thread execution. When such a construct is encountered, denoted by the parallel directive, a number of threads are spawned (the thread team) to execute the dynamic extent of a parallel region. This team of threads, including the main thread that spawned them, participates in the parallel computation. At the conclusion of the parallel region, the main thread waits at an implied barrier until all threads in the thread team complete execution. The main thread then resumes serial execution. Through the use of additional clauses, the programmer can specify attributes for the thread team; for example, the num_threads clause indicates the number threads to create.

As is well known in the art, many different sets of syntax may be used to demarcate inline code and threads for parallel execution.

DETAILED DESCRIPTION

In various embodiments, mechanisms are provided to allow the high level programming of heterogeneous processor having at least two sequencers each with a distinct ISA.

As used herein, a "sequencer" is a distinct thread execution resource and may be any physical or logical unit capable of executing a thread. A sequencer may be a logical thread unit or a physical thread unit, and may include next instruction pointer logic to determine the next instruction to be executed for the given thread. In many implementations, a system may include a first sequencer of a first ISA and a second computation resource (which may be a sequencer or non-sequencer) of a heterogeneous nature. That is, the second resource may be a sequencer of a different ISA or may be a non-sequencer resource, such as a fixed function unit (FFU), an application specific integrated circuit (ASIC) or other pre-programmed logic. In various embodiments, an intermediary or interface, referred to herein as an "exo-skeleton," may provide for communication between such heterogeneous resources. In different embodiments an exo-skeleton may take various forms, including software, hardware, and/or firmware. In some embodiments, the exo-skeleton may be implemented in a finite state machine (FSM) tightly coupled to the heterogeneous resource. Of course, other implementations are possible. In general, a sequencer for a heterogeneous resource may or may not be an "accelerator" but the terms are used interchangeably herein.

Figure 1:
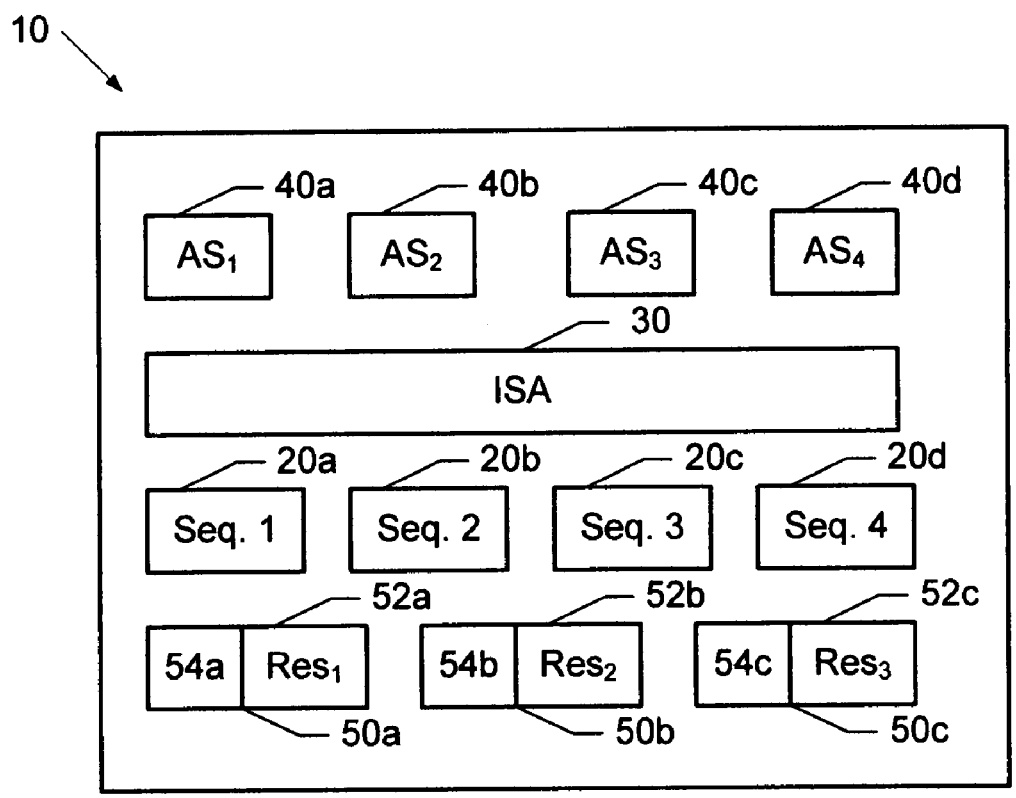
FIG. 1 depicts a processor in one embodiment.

Referring now to FIG. 1, shown is a block diagram of a processor in accordance with one embodiment of the present invention. As shown in FIG. 1, processor 10 includes a variety of different resources. In different implementations, processor 10 may be a single core processor or a multi-core processor. Such a processor may be implemented in different types of systems, including a chip multiprocessor (CMP) system, a simultaneous multithreading (SMT) system or a switch-on-event multithreading (SoeMT) system, among other such systems.

As shown in FIG. 1, processor 10 includes a plurality of sequencers 20a, 20b, 20c, and 20d (i.e., sequencers 1-4, and generically sequencers 20). While shown with four such sequencers in the embodiment of FIG. 1, it is to be understood that the scope of the present invention is not so limited. As shown in FIG. 1, sequencers 20 in processor 10 implement an ISA 30, which in one embodiment may be an Intel® Architecture (IA-32) instruction set architecture and/or its 64-bit extension (also called Intel® 64-bit technology). Processor 10 further includes other resources, including a first resource (i.e., resource 1) 50a, a second resource (i.e., resource 2) 50b, and a third resource 50c (i.e., resource 3) (and generically resources 50). These resources may be heterogeneous resources that do not implement ISA 30 of processor 10. While shown in the embodiment of FIG. 1 as including three such resources, more or fewer are possible in different embodiments.

Each resource 50 includes a sequencer (which may implement a different ISA from ISA 30), non-sequencer processing engine, or other specialized functional logic, referred to generically herein as an accelerator. In different embodiments, different types of resources may be implemented as accelerators, including a graphics processing unit (GPU) (typically a sequencer), such as in one embodiment an X3000 accelerator, cryptographic unit (typically a non-sequencer), a physics processing unit (PPU) (typically a non-sequencer), a fixed function unit (FFU) (typically a non-sequencer) and the like. As shown in FIG. 1, each resource 50 may include an accelerator 52 (generically) and more specifically, accelerators 52a, 52b, and 52c, each associated with one of resources 50a-50c. Accelerators 52 are also referred to herein as helper units. Because resources 50a-50c may be of another ISA or may even be a non-sequencer and as such can be heterogeneous with respect to sequencers 20, an interface may be used to provide the ability to communicate with such resources. Specifically as shown in FIG. 1, exo-skeletons 54a, 54b, and 54c (generically exo-skeleton 54) may be associated with each of resources 50. Each resource 50 may thus be referred to as an "exo-sequencer," indicating the tight coupling between exo-skeleton 54 and its associated accelerator 52. In this manner, these heterogeneous resources may be integrated with homogeneous sequencer resources in a unified ISA framework that supports inter-sequencer communication.

However in other embodiments, resources 50 may be homogeneous sequencer resources with respect to sequencers 20 and can be symmetric cores such that they include the same or similar architecture as sequencers 20. In such manner, concurrent fibers may be implemented and legacy OS scalability can be enhanced. Still further, in other implementations resources 50 may be asymmetric cores. In other words, these resources may be of the same ISA as sequencers 20, but of a different micro-architecture. Such embodiments may help manage the asymmetry and provide compatibility with a legacy OS.

For embodiments that implement heterogeneous resources, an exo-skeleton may provide the illusion that these heterogeneous resources are of a common ISA to achieve minimal compliance for inter-sequencer communications. Thus in various embodiments, a heterogeneous resource can function as a user-level functional unit resource (rather than a system-level device).

While shown with the particular resources in the embodiment of FIG. 1, it is to be understood that processor 10 may be a single physical processor that can support multiple hardware thread contexts (without loss of clarity, also called "thread context", note this is not the same as software thread context), each including a set of the architectural state. In some embodiments, certain resources may be visible to these thread contexts, while other resources are invisible. Thus as shown in FIG. 1, each of sequencers 20 may correspond to a thread context. When at least some of these thread contexts (e.g., m out of n, m≦n) are made visible to the operating system, these thread contexts are sometimes referred to as logical processors or OS-managed sequencers (OMS's). Each thread context maintains a set of the architecture state AS1-ASn, respectively. The architecture state includes, for example, data registers, segment registers, control registers, debug registers, and most of the model specific registers. The thread contexts may share most micro-architectural resources of the physical processor, such as caches, execution units, branch predictors, control logic and buses. Although such features may be shared, each thread context of processor 10 can independently generate a next instruction address (and perform, for instance, a fetch from an instruction cache, an execution instruction cache, or trace cache). Each of sequencers 20 corresponding to a thread context is associated with a corresponding architecture state 40 (generically). More specifically, architecture state (AS1) 40a may be associated with sequencer 20a, AS2 40b may be associated with sequencer 20b, AS3 40c may be associated with sequencer 20c, and AS4 40d may be associated with sequencer 20d, for example.

Using processor 10 or a similar such processor, ISA-based inter-sequencer communications may occur without involving an OS. For example, in a shared-memory multiprocessing paradigm an application programmer may split a software program (i.e., an application or process) into multiple tasks to be run concurrently in order to express parallelism. All threads of the same software program ("process") share a common logical view of memory address space. However, an OS thread may be associated with multiple user-level threads that may not be created, scheduled, or otherwise managed by the operating system. Such user-level threads may be referred to as "shreds," in order to distinguish them from OS threads. These shreds may not be visible to the OS scheduler and therefore the OS does not manage when or how the associated OS thread schedules a shred to run on an assigned logical sequencer address. The OS thread is itself usually responsible to schedule when and how to run one of its shreds.

In one embodiment, an integrated programming environment is provided for developing code for a processor such as processor 10 of FIG. 1, having a heterogeneous set of resources, such as both a CPU and GPU. In one embodiment, changes are made to extend the legacy x86 optimizing C/C++ compiler to support accelerator-specific inline assembly and domain specific languages for a heterogeneous sequencer of the processor such as a GPU. The compiler produces a single fat binary consisting of code sections corresponding to different instruction sets for the different ISAs associated with the heterogeneous resources of the processor. In this embodiment, the compiler supports OpenMP pragmas with extensions of new clauses for heterogeneous multithreading, and the runtime support may distribute the computation in parallel among the heterogeneous resources of the processor to optimize the performance and power.

Figure 2:
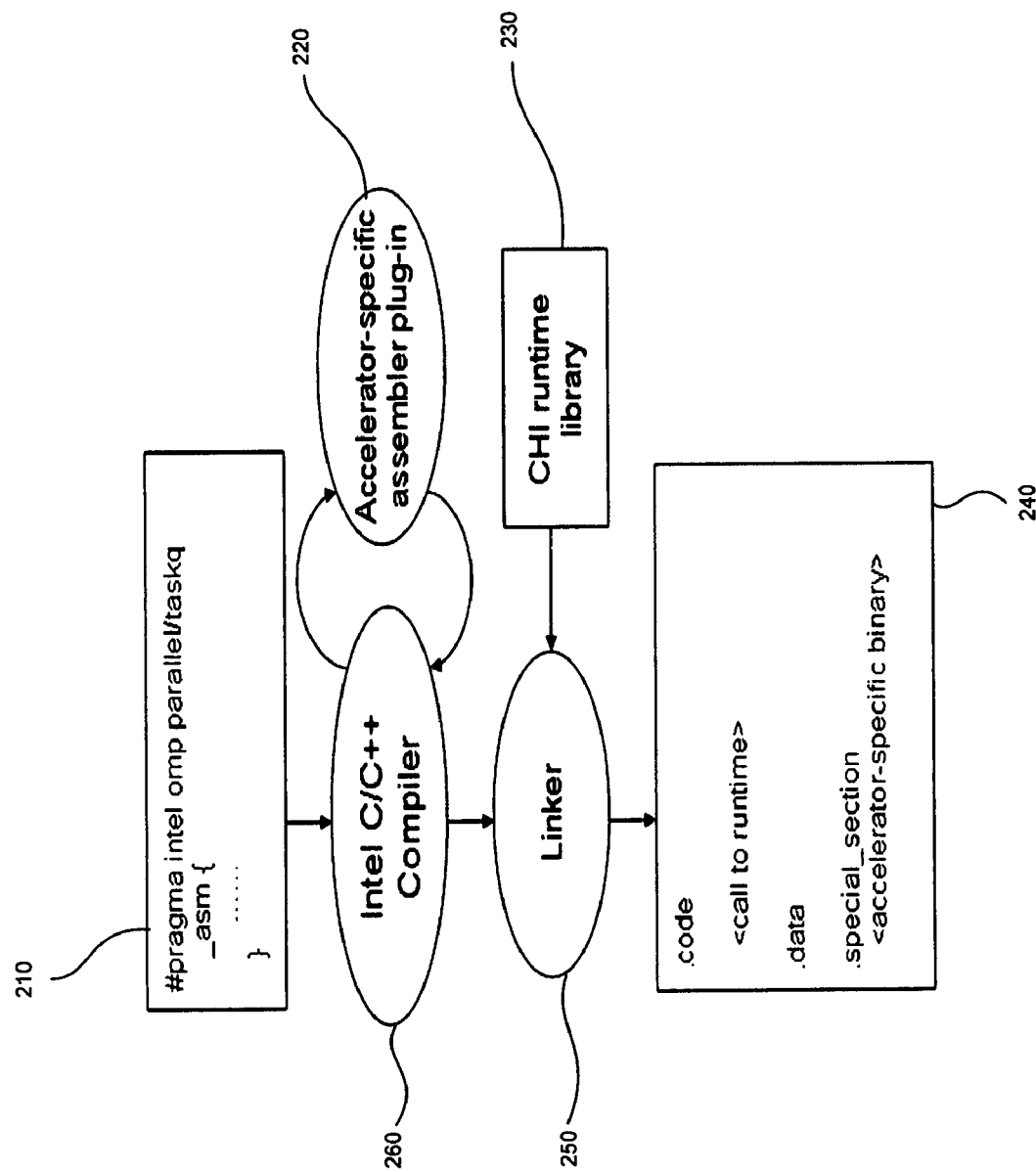
FIG. 2 depicts the structure of a programming environment in one embodiment.

In one embodiment, a programming environment designed to support seamless integration of accelerator-specific assembly and domain-specific language with the legacy x86-based C/C++ compiler, runtime toolset, and debugger is provided. FIG. 2 depicts the overall compilation infrastructure.

Three capabilities are provided in the compiler 260 of this embodiment to allow programmers to express multithreaded computation for the heterogeneous resources in the C/C++ source code First, a method to specify a region of accelerator-specific computation in either inline assembly or domain-specific language, such as the code block depicted at 210, by the _asm construct. Second, a method to specify fork-join or producer-consumer styled thread-level parallel execution for the inline accelerator-specific code region with OpenMP style pragmas, as specified by the pragma construct also shown at 210 in FIG. 2. Third, a method that specifies input and output memory regions and live-in register values for the accelerator-specific code region is provided using the firstprivate, private, and shared directives in code block 210.

In this embodiment, this infrastructure is implemented by extending an x86 C/C++ production compiler 260 to support accelerator-specific inline assembly at 220 within the C/C++ source, OpenMP extensions to support multithreading on heterogeneous resources of the target processor, and the related runtime support. The final binary 240 produced by the compiler consists of executable code sections of different ISAs. The runtime library 230 is responsible for scheduling heterogeneous user-level threads across the heterogeneous resources of the processor. The compiler may also produce debugging information in the fat binary which can be used by an enhanced debugger to do source level debugging for both C/C++ code on the x86 CPU target and the accelerator-specific code on the accelerator target.

High-level languages compilation system, such as the C/C++ compiler 260, usually provide a facility to inline assembly code blocks directly within the high-level source code. This capability allows the most performance-critical parts of a program to be replaced with hand-optimized assembly and to provide access to new instructions or processor features not exposed through the compiler. As such, this inline assembly construct may be naturally extended to support accelerator-specific inline assembly support.

In the prototype embodiment the Microsoft MASM syntax is adopted and extended where brackets are used to enclose the assembly statements and specify a block. The full syntax is as follows.

_asm {asm_statements;}

_asm is the keyword that indicates the enclosed block of code is a special assembly block written specifically for the given heterogeneous resource ISA. The asm_statements enclosed in brackets "{ }" are compiled into an accelerator-specific executable binary. The target ISA for the asm statements may be specified through the enclosing OpenMP pragma with a target clause as shown at 210.

As shown in FIG. 2, a separate target accelerator-specific instruction set assembler 220 is dynamically linked with the compiler. Similar to traditional inline assembly, this accelerator-specific assembler creates code for the target ISA by translating the inline assembly instructions enclosed in the asm brackets into binary code, and by resolving symbolic names for memory locations and other entities referenced within the asm block. After the assembler compiles the asm block, the resulting binary code is embedded in a special code section of the executable 240 produced by the compiler and the linked assembler and is indexed with a unique identifier. The final executable is a fat binary, consisting of binary code sections corresponding to user-level threads in x86 and multiple accelerator instruction sets, including in one embodiment, Intel X3000 accelerator cores. With similar inline compilation mechanism, the proposed compiler also supports integration of a domain-specific high-level language for programming the X3000 accelerator hardware.

It should be noted that many variations of the embodiments discussed above with reference to FIG. 2 are possible. The choice of syntax for the delineation of the inline assembly may vary. A different construct from the OpenMP pragma may be used to define parallel execution in other embodiments. The source language in other embodiments may not be C or C++ but another language such as FORTRAN or Ada.

In its traditional usage, the OpenMP parallel construct is used to demarcate a program region for fork-join parallel thread execution, as is well known in the art. When such a construct is encountered, denoted by the parallel directive, a number of threads are spawned (the thread team) to execute the dynamic extent of a parallel region. This team of user-level threads, including the main thread that spawned them, may participate in a parallel computation. At the conclusion of the parallel region, the main thread waits at an implied barrier until all threads in the thread team complete execution. The main thread then may resume serial execution. Through the use of additional clauses, the programmer may specify attributes for the thread team; for example, the num_threads clause indicates the number of user-level threads to create.

In one embodiment, the infrastructure extends the OpenMP parallel pragma. The construct for targeting an accelerator-specific instruction set as in 210 of FIG. 2 is as follows:

pragma omp parallel target(targetISA) [clause[[,]clause]...]structured-block
Where clause can be any of the following:
    firstprivate(variable-list)
    private(variable-list)
    shared(variable-ptr-list)
    descriptor(descriptor-ptr-list)
    num_threads(integer-expression)
    master_nowait The target clause is introduced to specify the particular accelerator instruction set used within the section of the parallel region. The compiler will appropriately set up calls to the runtime layer to enable dynamic user-level thread scheduling and dispatching onto the targeted heterogeneous accelerator sequencers. When the main x86 thread encounters an accelerator-specific parallel construct with the clause target(targetISA), the x86 thread spawns a team of integer-expression accelerator-specific user-level threads for the parallel region, where each eventually executes the enclosed asm block on an application-managed accelerator sequencer. By default, the main x86 thread waits at the end of the construct until it is notified by the runtime of the completion of all user-level accelerator threads. Similar to the traditional nowait clause, an optional master_nowait clause is introduced to allow the main x86 thread to continue execution past the construct after spawning the team of accelerator threads, without having to wait for the completion of the accelerator threads. This allows concurrent execution on both the x86 sequencer and its application-managed accelerator sequencers. The runtime is responsible to asynchronously notify the x86 sequencer of the eventual completion of all accelerator threads. This concurrency model presents an interesting opportunity to manage parallelism. For example, the developer may use the accelerator threads to process ⅔ of an image while using the main x86 thread to process the rest of the image in parallel.

The data communication between the heterogeneous threads can be specified via data clauses, namely, shared, firstprivate, and private. In the proposed extension to OpenMP parallel directive for accelerator threads, the semantics of these clauses remain identical to their respective origin for homogeneous symmetric multiprocessor, in both syntax and spirit. By definition, for each variable specified in the shared clause, all threads in a team can access the same memory area. For each variable specified in the firstprivate clause, a thread private copy-constructed variable is created for all threads with the same value. When a parallel for loop is used, the compiler parses the loop construct and, for the variables specified in the private clause, each thread context is copied with different copy-constructed variable values evaluated by each loop iteration. Then when a team of threads is launched, each thread executes the same code in the pragma with unique input values. A new descriptor clause is also introduced to allow programmer to optionally associate an acceleratorspecific descriptor to a variable enumerated in the shared clause.

For heavily optimized accelerators, the number of accelerator threads launched may be quite large. For example, in a parallel media filtering operation, such as artificial aging through application of the sepia tone filter, each macroblock in the input image can be independently processed by a separate parallel thread. Through the use of parallel pragma, the coordinate of the macro block (sub-unit of the image) for each thread to operate on is calculated based on the loop index and passed in through the private clause, while the entire source image is shared among all accelerator threads via the shared clause. For a large picture, tens of thousands of accelerator threads may be created. The accelerator threads are short lived and run as user-level threads that are created by the run time layer. The application programmer will benefit from creating as many threads as possible as the hardware can mask the latency of stall events effectively by switching between multiple threads.

As before, many alternative implementations of the parallel pragma are possible. The actual syntax and keywords may vary without affecting the described parallel structure; in some embodiments some classes of variable sharing may not be available, while in others different versions may be provided. The number of parallel threads may be limited to an upper bound in some embodiments. Many other variations are possible.

The runtime support 230 and linker 250 of FIG. 2 provide a software library that translates the programmer specified OpenMP-like directives into primitives to create the user level threads that can carry out the parallel execution on the heterogeneous multi-resource target. The runtime layer provides a layer of abstraction that hides the details of managing the accelerator sequencers from users of the OpenMP pragmas. The runtime layer may differ from one accelerator to another and is specific to the ISA of a given accelerator. Built on the execution model, the runtime layer uses the architectural support for multiple sequencers for heterogeneous resources to implement user-level inter-sequencer communication and proxy execution to schedule and dispatch the accelerator threads for execution and handle exceptions that may occur. The compiler translates the extension to OpenMP parallel pragma to a series of calls to the runtime layer, to appropriately configure the accelerator hardware for parallel execution. The accelerator-specific asm block is replaced with a call into a runtime service that is responsible for locating the corresponding accelerator binary code in the fat binary and initiating the parallel execution of the accelerator thread by dispatching its thread continuation to the accelerator sequencer through inter-sequencer signaling instruction. As before implementation details of the runtime may vary across embodiments.

Two additional responsibilities of the runtime system are to allow the programmer to specify the appropriate format of the input data for correct consumption by the accelerator, and to provide additional API support for configuring any accelerator-specific state. We discuss these two topics in more detail below.

General purpose CPU architectures, such as the x86 family, define virtual address space as a 1-D linear contiguous uniform memory space. For such architectures a memory object (e.g. a global or local variable) in C/C++ can be easily bound to an operand in the inline assembly via a register move or a load instruction. However, an accelerator's architecture may view memory in a significantly different way from the general purpose CPU. For instance, most graphics and media accelerators access virtual memory via surfaces, which are two dimensional blocks of memory. Each surface is fully isolated from the other, and each can have significantly different attributes from the other. Surface information such as the tiling format and how to handle loads and stores outside the surface boundary are important attribute that media acceleration code requires to achieve best performance. The runtime provides APIs for the C/C++ program to provide this information via calls into the accelerator's particular runtime library. The runtime library then encapsulates this information and prepares the data structures, known as descriptors that are used by the accelerator to interpret the attributes of the variables that are accessed within by the user level threads that run on the accelerator. Variable binding does not involve copying the data as both the accelerator and the x86 core access the same memory location as they share the virtual address space.

The core interface and the OpenMP pragma extensions satisfy the generic needs of a heterogeneous multithreading mechanism. In fact, the extensions discussed earlier are quite powerful, and are sufficient to execute the wide range of the workloads studied in this paper. However, since not all hardware accelerators are alike, the runtime system provides two additional APIs to exploit those implementation-specific features.

The two generic runtime APIs allow the programmers to specify and access specialized features on accelerators. One makes a global change to all exo-sequencers' states, which apply to all heterogeneous shreds created. The other one changes an exosequencer's state on a per shred basis. An application can directly utilize new hardware features simply by making the appropriate call in the source file, without requiring any changes to the compiler.

Figure 3:
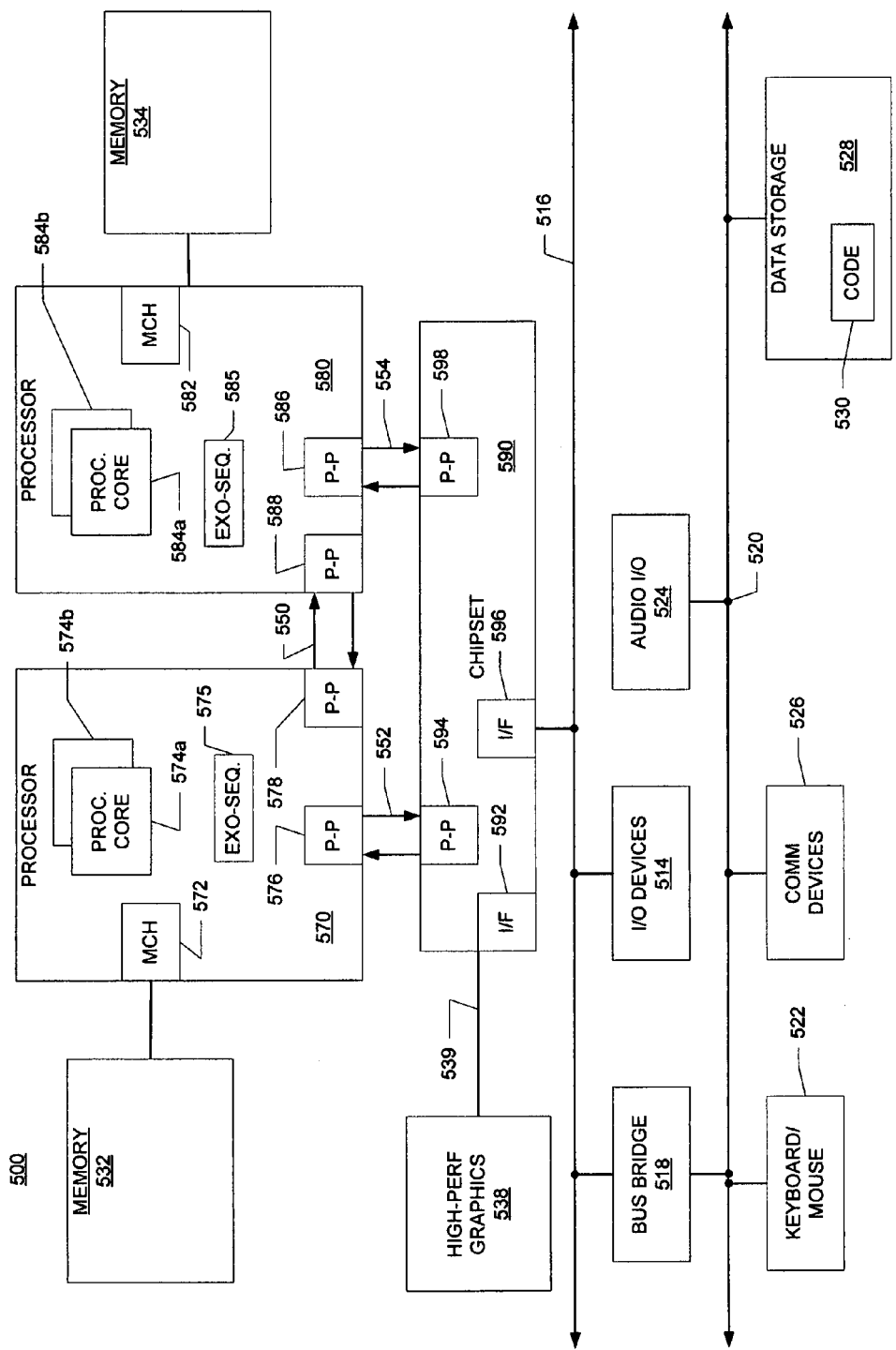
FIG. 3 depicts a processor based system.

Embodiments may be implemented in many different system types. Referring now to FIG. 3, shown is a block diagram of a system in accordance with an embodiment of the present invention. As shown in FIG. 3, multiprocessor system 500 is a point-to-point interconnect system, and includes a first processor 570 and a second processor 580 coupled via a point-to-point interconnect 550. As shown in FIG. 3, each of processors 570 and 580 may be multicore processors, including first and second processor cores (i.e., processor cores 574*a* and 574*b* and processor cores 584*a* and 584*b*). Each of processors 570 and 580 may further include an exo-sequencer, i.e., a first exo-sequencer 575 and a second exo-sequencer 585. As discussed above, exo-sequencers 575 and 585 may be heterogeneous resources with respect to the remaining resources of processor cores 570 and 580. While shown with only a single exo-sequencer per processor, it is to be understood that the scope of the present invention is not so limited. In other embodiments, multiple exo-sequencers may be present in a given processor. Furthermore, one or more exo-sequencers may be associated with each individual core of a processor.

First processor 570 further includes a memory controller hub (MCH) 572 and point-to-point (P-P) interfaces 576 and 578. Similarly, second processor 580 includes a MCH 582 and P-P interfaces 586 and 588. As shown in FIG. 3, MCH's 572 and 582 couple the processors to respective memories, namely a memory 532 and a memory 534, which may be portions of main memory locally attached to the respective processors.

First processor 570 and second processor 580 may be coupled to a chipset 590 via P-P interconnects 552 and 554, respectively. As shown in FIG. 3, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the *Accelerated Graphics Port Interface Specification, Revision* 2.0, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the *PCI Local Bus Specification, Production Version, Revision* 2.1, dated Jun. 1995 or a bus such as a PCI Express bus or another third generation I/O interconnect bus, although the scope of the present invention is not so limited.

As shown in FIG. 3, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Note that other architectures are possible. For example, instead of the point-to-point architecture of FIG. 3, a system may implement a multi-drop bus or another such architecture.

Some portions of the detailed description above are presented in terms of algorithms and symbolic representations of operations on data bits within a processor-based system. These algorithmic descriptions and representations are the means used by those skilled in the art to most effectively convey the substance of their work to others in the art. The operations are those requiring physical manipulations of physical quantities. These quantities may take the form of electrical, magnetic, optical or other physical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

In the description of the embodiments, reference may be made to accompanying drawings. In the drawings, like numerals describe substantially similar components throughout the several views. Other embodiments may be utilized and structural, logical, and electrical changes may be made. Moreover, it is to be understood that the various embodiments, although different, are not necessarily mutually exclusive. For example, a particular feature, structure, or characteristic described in one embodiment may be included within other embodiments.

Further, a design of an embodiment that is implemented in a processor may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. A memory, or a magnetic or optical storage such as a disc may be the machine readable medium. Any of these mediums may "carry" or "indicate" the design or software information. A communication provider or a network provider may make copies of an article that constitute or represent an embodiment.

Embodiments may be provided as a program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a program product, wherein the program may be transferred from a remote data source to a requesting device by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the claimed subject matter but to illustrate it. The scope of the claimed subject matter is not to be determined by the specific examples provided above but only by the claims below.

What is claimed is:

1. A method comprising:
compiling, with a computing system, a source code program for a heterogeneous processor having
a first instruction sequencer, having a first instruction set architecture; and
an accelerator to the first instruction sequencer, wherein the accelerator comprises a heterogeneous sequencer with respect to the first instruction sequencer,
the heterogeneous sequencer having a second instruction set architecture;
the source code program having specified therein a specification for parallel execution of a region of source code for the first instruction set architecture of the processor for the first sequencer and a region of source code for the second instruction set architecture of the processor for the heterogeneous sequencer, wherein the region of source code for the second instruction set architecture is specified by a demarcation of the source code for the second instruction set architecture for parallel execution;

wherein the demarcation further comprises:
specification of the second instruction set architecture for the source code by an identifier for the second instruction set architecture;
specification of a number of user-level threads to be spawned;
definition of private and shared variables for each user-level thread;
definition of actions to be taken by each user-level thread in a block of code; and
definition of the descriptor for the shared variables.

2. The method of claim 1 wherein the region of source code for the second instruction set architecture of the processor is specified by keyword and a block definition inserted inline into the source code for the first instruction set architecture of the processor.

3. The method of claim 1 further comprising creating object code for the second instruction set architecture of the processor and embedding the object code in an executable produced by the compiling by translating the source code for the second instruction set architecture using an accelerator-specific translator linked with the compilation.

4. The method of claim 3 wherein the accelerator specific translator is for a domain specific high level language, the source code for the second instruction set architecture is inlined source code for the second instruction set architecture, and the executable is a fat binary comprising binary code sections corresponding to user-level threads and multiple instruction set architectures.

5. A machine readable non-transitory medium having stored thereon a compiler, the compiler when executed by a machine causing the machine perform a method, the method comprising:
compiling a source code program for a heterogeneous processor having a first instruction sequencer, having a first instruction set architecture; and
an accelerator to the first instruction sequencer, wherein the accelerator has a second instruction set architecture,
the source code program having specified therein a specification for parallel execution of a region of source code for the first instruction set architecture of the processor for the first sequencer and a region of source code for the second instruction set architecture of the processor for the accelerator, wherein the region of source code for the second instruction set architecture is specified by a demarcation of the source code for the second instruction set architecture for parallel execution;
wherein the demarcation further comprises:
specification of the second instruction set architecture for the source code by an identifier for the second instruction set architecture;
specification of a number of user-level threads to be spawned;
definition of private and shared variables for each user-level thread;
definition of actions to be taken by each user-level thread in a block of code; and
definition of the descriptor for the shared variables.

6. The machine readable medium of claim 5 wherein the region of source code for the second instruction set architecture of the processor is specified by keyword and a block definition inserted inline into the source code for the first instruction set architecture of the processor.

7. The machine readable medium of claim 5 further comprising creating object code for the second instruction set architecture of the processor and embedding the object code in an executable produced by the compiling by translating the source code for the second instruction set architecture using an accelerator-specific translator linked with the compilation.

8. The machine readable medium of claim 7 wherein the accelerator specific translator is for a domain specific high level language, the source code for the second instruction set architecture is inlined source code for the second instruction set architecture, and the executable is a fat binary comprising binary code sections corresponding to user-level threads of multiple instruction set architectures.

9. A system comprising:
a processor;
a memory; and
a storage, the storage having stored therein a compiler which when loaded into the memory and executed by the processor, causes the processor to perform a method, the method comprising
compiling a source code program for a heterogeneous processor having a first instruction sequencer, having a first instruction set architecture,
an accelerator to the first instruction sequencer, wherein the accelerator comprises a heterogeneous sequencer with respect to the first instruction sequencer having a second instruction set architecture,
the source code program having specified therein a specification for parallel execution of a region of source code for the first instruction set architecture of the processor and a region of source code for the second instruction set architecture of the processor for the heterogeneous sequencer wherein the region of source code for the second instruction set architecture is specified by a demarcation of the source code for the second instruction set architecture for parallel execution,
wherein the demarcation further comprises:
specification of the second instruction set architecture for the source code by an identifier for the second instruction set architecture;
specification of a number of user-level threads to be spawned;
definition of private and shared variables for each user-level thread;
definition of actions to be taken by each user-level thread in a block of code; and
definition of the descriptor for the shared variables.

10. The system of claim 9 wherein the region of source code for the second instruction set architecture of the processor is specified by keyword and a block definition inserted inline into the source code for the first instruction set architecture of the processor.

11. The system of claim 9 further comprising creating object code for the second instruction set architecture of the processor and embedding the object code in an executable produced by the compiling by translating the source code for the second instruction set architecture using an accelerator-specific translator linked with the compilation.

12. The system of claim 11 wherein the accelerator specific translator is for a domain specific high level language, the source code for the second instruction set architecture is inlined source code assembly for the second instruction set architecture, and the executable is a fat binary comprising binary code sections corresponding to user-level threads and multiple instruction set architectures.

* * * * *